(12) United States Patent
Darnell

(10) Patent No.: US 8,460,420 B2
(45) Date of Patent: Jun. 11, 2013

(54) FILTER ELEMENT

(75) Inventor: Justin R. Darnell, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 298 days.

(21) Appl. No.: 12/206,201

(22) Filed: Sep. 8, 2008

(65) Prior Publication Data

US 2009/0064647 A1 Mar. 12, 2009

Related U.S. Application Data

(60) Provisional application No. 60/970,685, filed on Sep. 7, 2007.

(51) Int. Cl.
*B01D 46/00* (2006.01)

(52) U.S. Cl.
USPC ............... 55/385.3; 55/480; 55/482; 55/492; 55/497; 123/198 E

(58) Field of Classification Search
USPC ...... 55/481, 521, 490–519, 385.3; 123/198 E
See application file for complete search history.

(56) References Cited

U.S. PATENT DOCUMENTS

| | | | |
|---|---|---|---|
| 3,165,473 A | 1/1965 | Pall et al. | |
| 3,460,322 A | 8/1969 | Rivers et al. | |
| 4,737,174 A | 4/1988 | Pontius | |
| 5,213,596 A * | 5/1993 | Kume et al. | 55/481 |
| 5,472,379 A | 12/1995 | Andress et al. | |
| 5,512,074 A | 4/1996 | Hanni et al. | |
| 5,800,581 A * | 9/1998 | Gielink et al. | 55/385.3 |
| 5,921,520 A | 7/1999 | Wisniewski | |
| 6,022,055 A | 2/2000 | Coulonvaux et al. | |
| 6,039,778 A * | 3/2000 | Coulonvaux | 55/498 |
| 6,402,798 B1 * | 6/2002 | Kallsen et al. | 55/385.3 |
| 6,454,834 B1 * | 9/2002 | Livingstone et al. | 95/11 |
| 6,589,307 B2 * | 7/2003 | Jaramillo et al. | 55/385.3 |
| 6,692,347 B1 * | 2/2004 | Schneider | 454/158 |
| 6,857,399 B2 * | 2/2005 | Davis et al. | 123/41.7 |
| 6,932,849 B2 | 8/2005 | Sheidler et al. | |
| 6,955,698 B2 * | 10/2005 | Hettmann et al. | 55/385.3 |
| 6,991,665 B1 | 1/2006 | Allen et al. | |
| 7,736,410 B2 * | 6/2010 | Kuempel et al. | 55/481 |
| 7,753,982 B2 * | 7/2010 | Merritt | 55/502 |
| 7,763,105 B2 * | 7/2010 | Ye et al. | 96/401 |
| 7,905,936 B2 * | 3/2011 | Coulonvaux et al. | 55/357 |
| 2002/0069624 A1 * | 6/2002 | Jaramillo et al. | 55/385.3 |
| 2003/0051455 A1 * | 3/2003 | Gieseke et al. | 55/482 |
| 2004/0025810 A1 * | 2/2004 | Davis et al. | 123/41.7 |
| 2004/0134171 A1 * | 7/2004 | Scott et al. | 55/482 |
| 2004/0221555 A1 * | 11/2004 | Engelland et al. | 55/502 |
| 2005/0229561 A1 * | 10/2005 | Nepsund et al. | 55/481 |
| 2006/0021932 A1 * | 2/2006 | Darnell et al. | 210/459 |

OTHER PUBLICATIONS

Webster's Ninth New Collegiate Dictionary, 1986.*

* cited by examiner

*Primary Examiner* — Duane Smith
*Assistant Examiner* — Thomas McKenzie
(74) *Attorney, Agent, or Firm* — Renner, Otto, Boisselle & Sklar LLP

(57) ABSTRACT

A filter element (300) comprising a housing (400) and a filter medium (500). The housing (400) comprises a plurality of walls forming a filter compartment (420), and an outlet chamber (422). A downstream wall (448) has a circular outlet opening (470) and an annular sealing gasket (472) surrounding the outlet opening (470). Lower corners (450) and sidewall fingers (452) carry clips (454, 456) for mounting the filter element (300) to an affixed bracket. The bottom wall (442) has a shroud-aligning catch (466) and fastener-insertion receptacles (468) for shroud-securing thumbscrews.

19 Claims, 20 Drawing Sheets

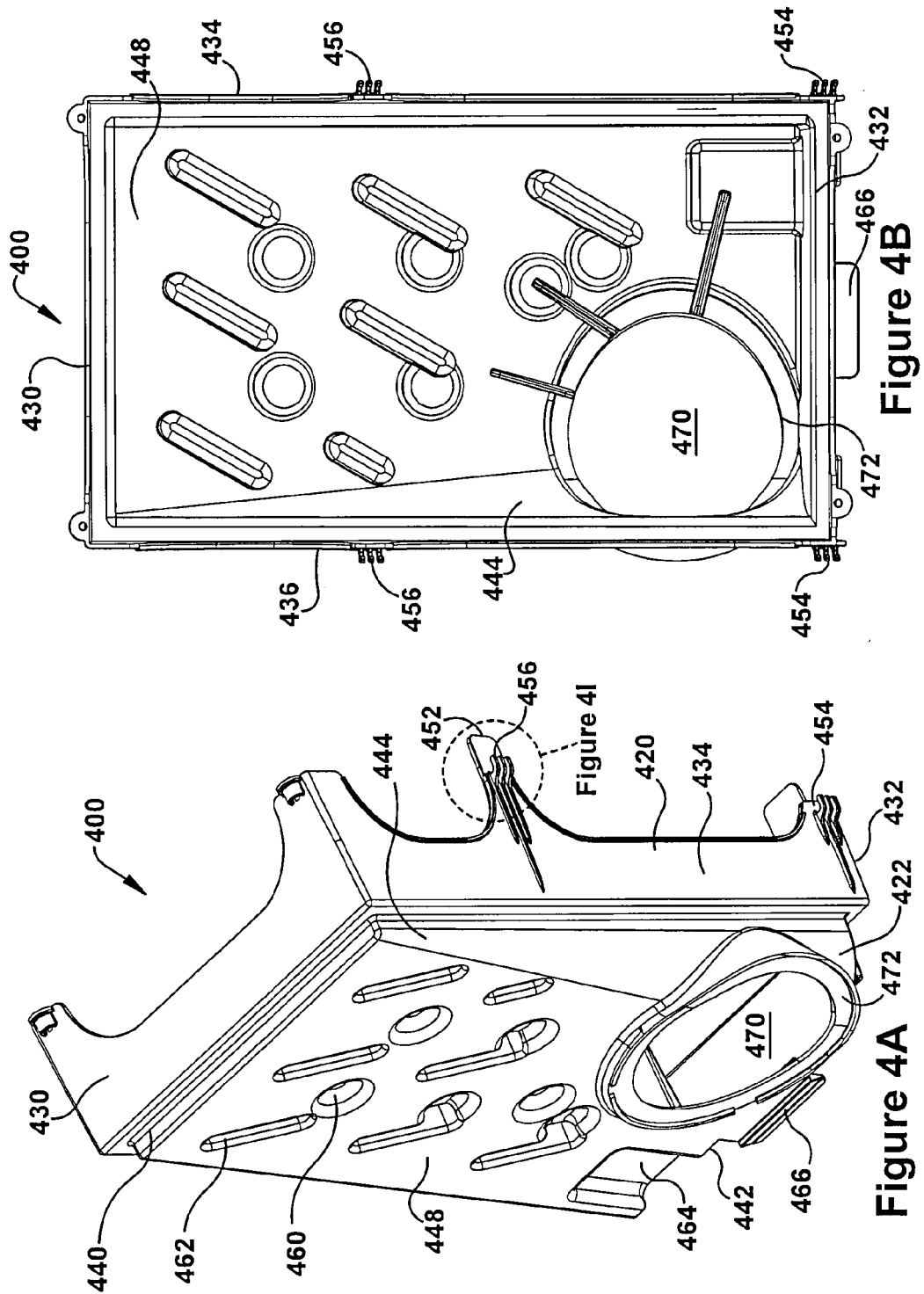

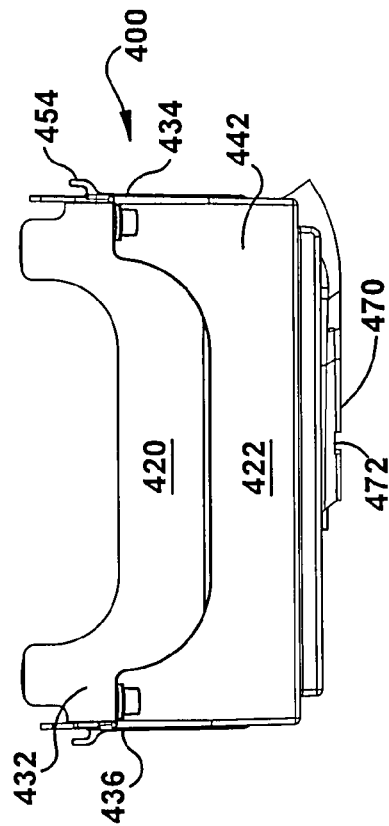
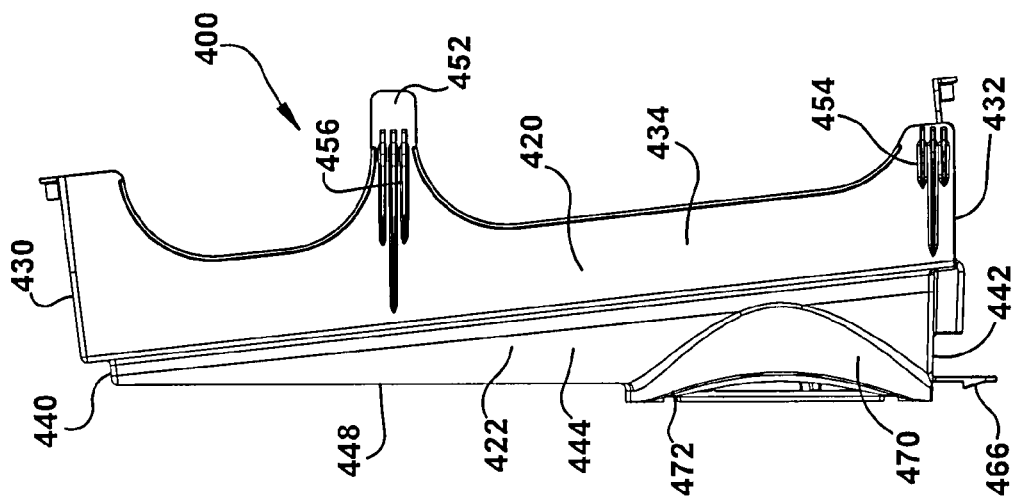

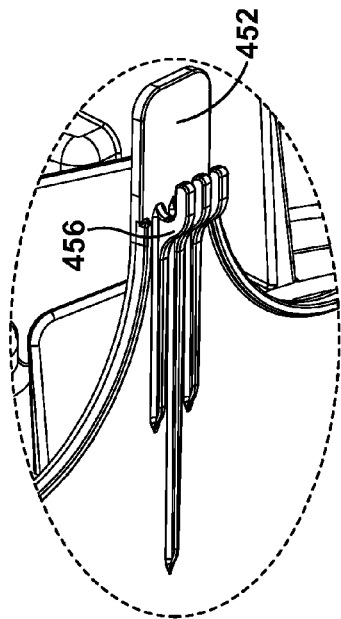
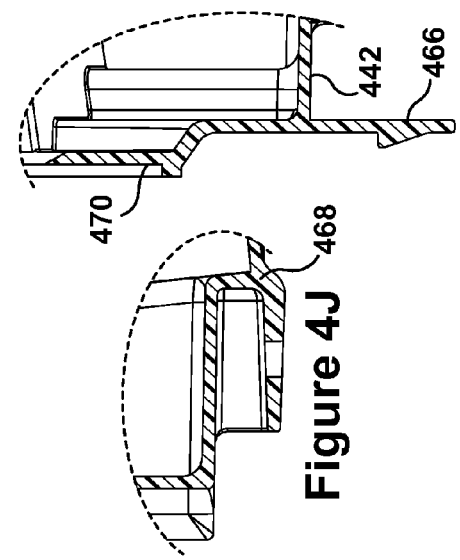
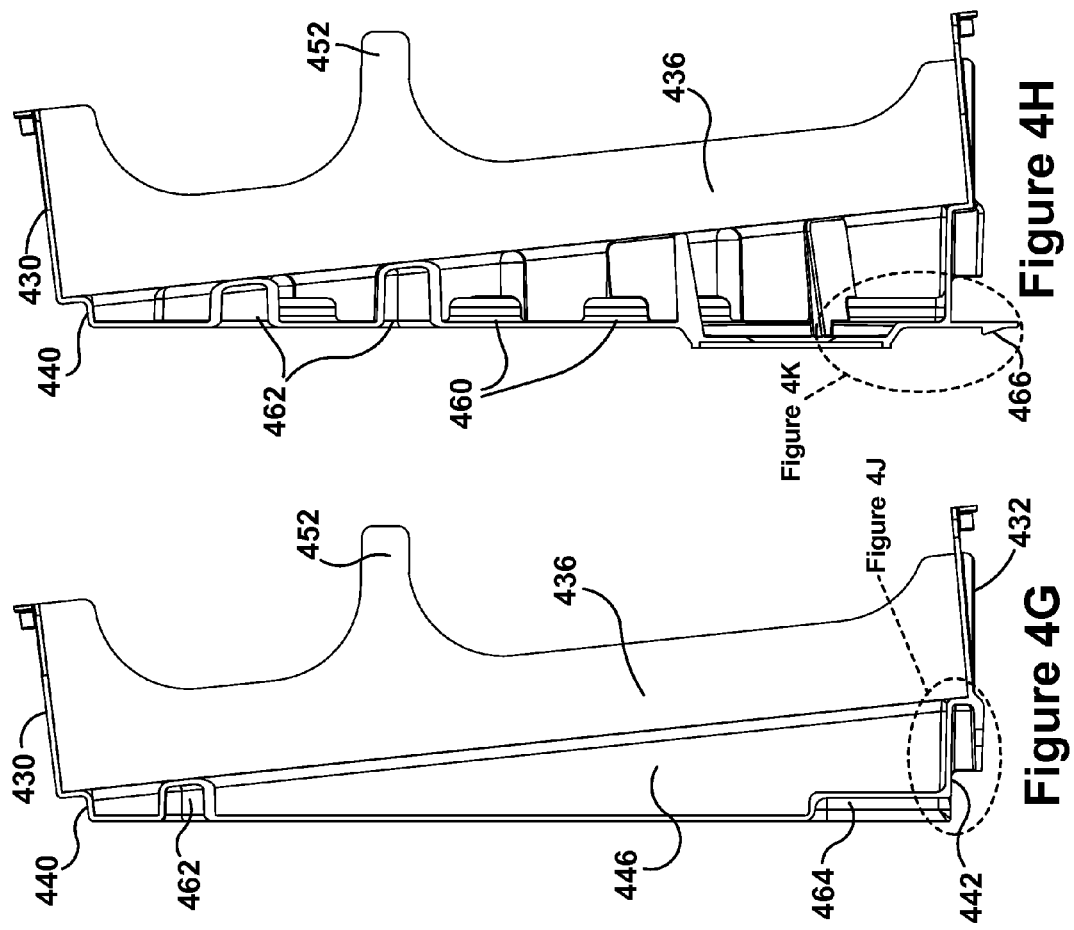

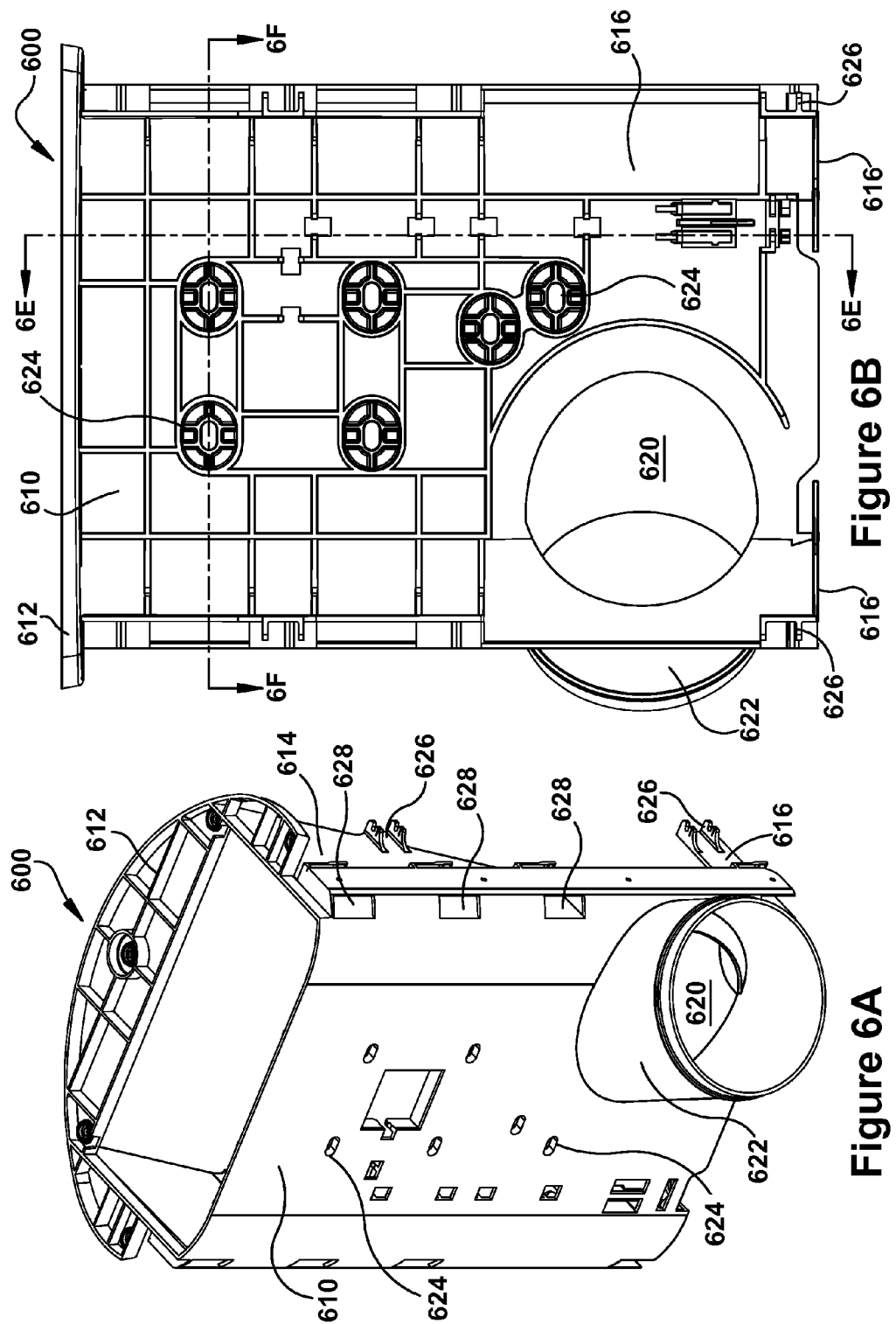

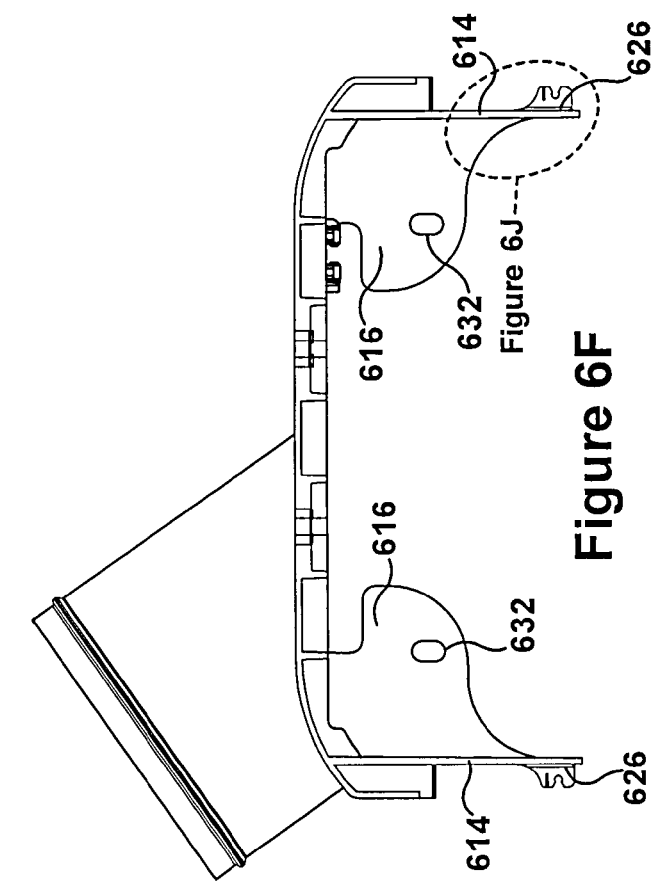
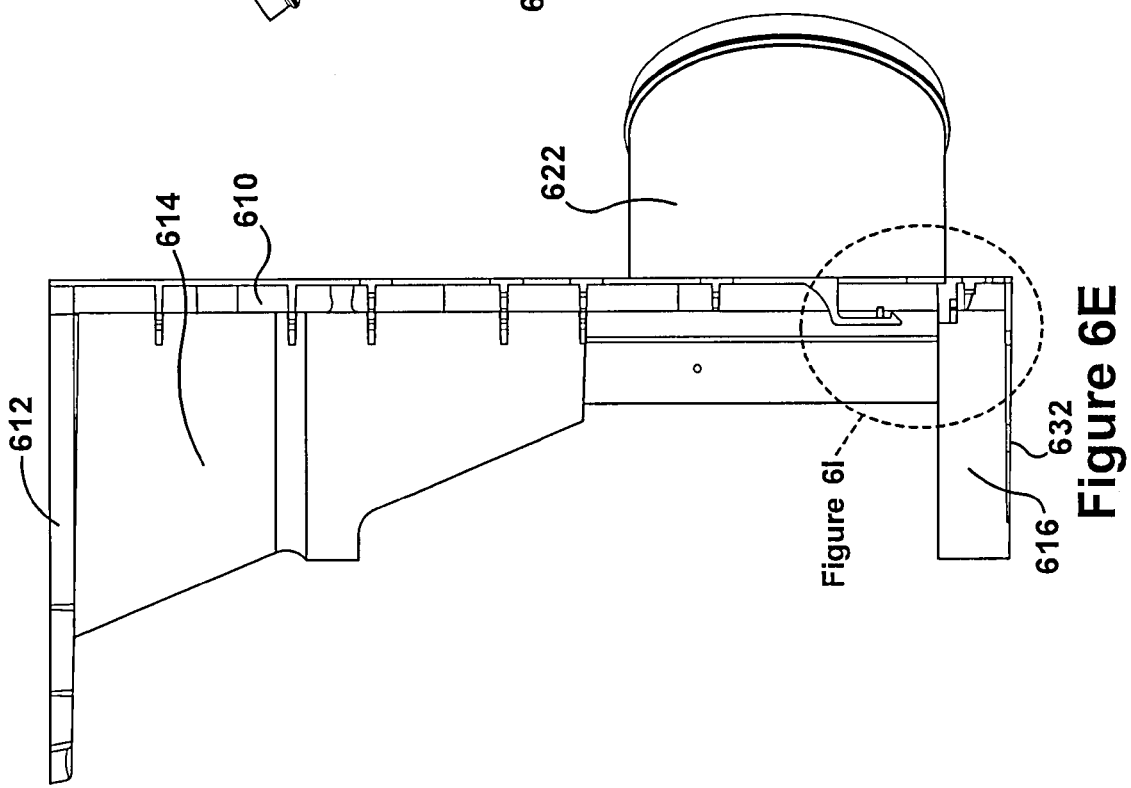

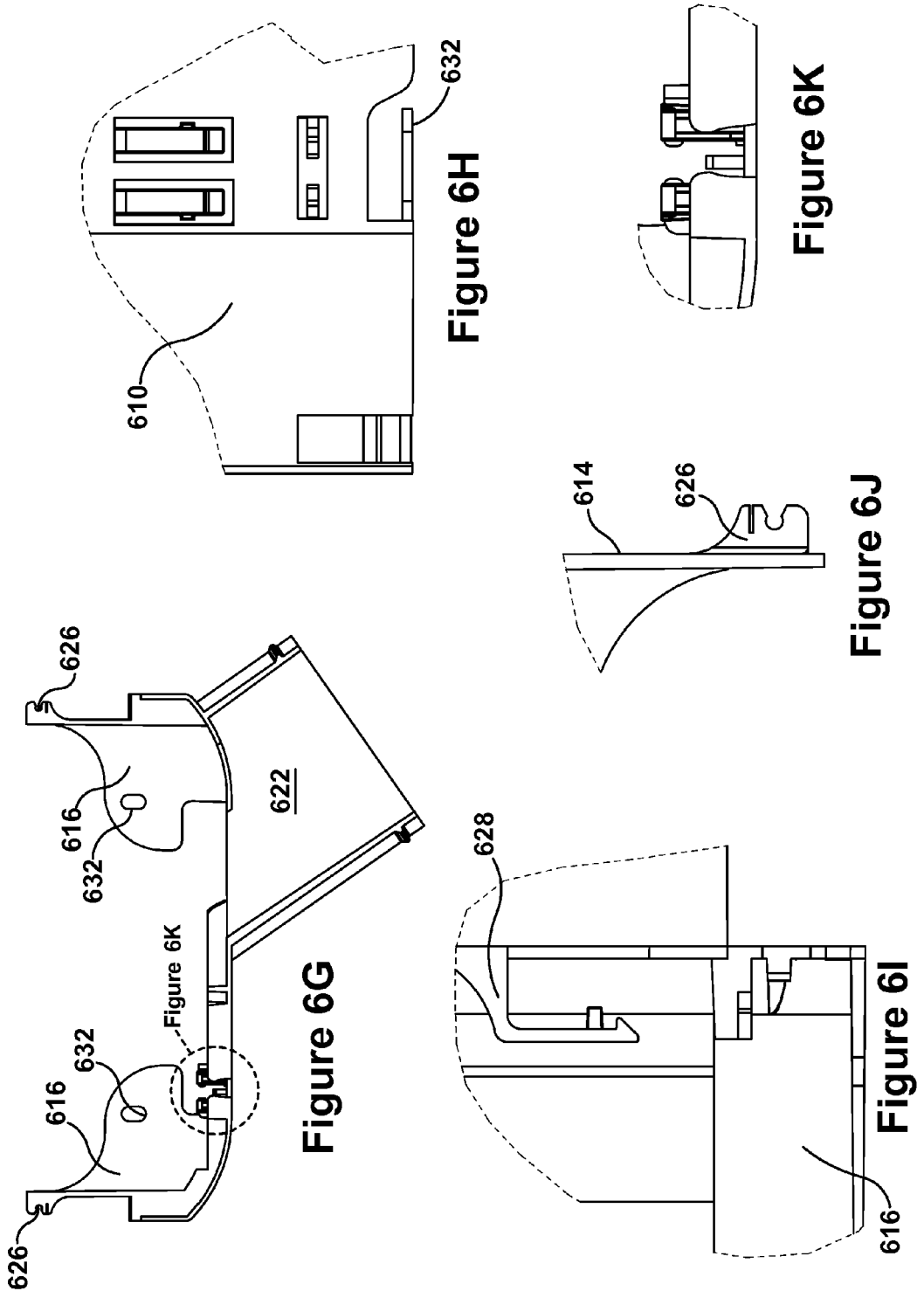

FILTER ELEMENT

RELATED APPLICATION

This application claims priority under 35 U.S.C. 119 (e) to U.S. Provisional Patent Application No. 60/970,685 filed on Sep. 7, 2007. The entire disclosure of this provisional application is hereby incorporated by reference. If incorporated-by-reference subject matter is inconsistent with subject matter expressly set forth in the written specification and drawings of this application, the present disclosure governs to the extent necessary to eliminate indefiniteness and/or clarity-lacking issues.

GENERAL FIELD

A filter element for use with a filter assembly that, for example, filters engine-intake air in a relatively large motor vehicle, such as a truck.

BACKGROUND

A transportation vehicle, such as a truck, typically has a filter assembly that filters engine-intake air to remove potentially clogging particulates. Such a filter assembly can comprise a bracket permanently affixed to the vehicle, a canister or other covering secured to the bracket, and a filter element enclosed by the canister. While the bracket and the canister are usually considered permanent components of the assembly, the filter element is intended to be periodically replaced.

SUMMARY

A filter element is provided that can be used, for example, to filter engine-intake air in a transportation vehicle such as a truck. The filter element comprises a filter medium in the shape of rectangular block, whereby it may be positioned perpendicular (or otherwise) to the direction of vehicle travel. This allows straight-through air flow as compared to, for example, the inlet flow pattern with a cylindrical filter medium.

The filter media is sealed to the housing such that fluid must flow through its outlet face to enter the outlet chamber. And a sealing gasket seals the interface between its outlet and an exit opening in a bracket fixed to the vehicle. Thus the filter element is self contained and does not require an air-tight canister to prevent filter-bypass flow.

The shroud (which performs the filter-covering function in place of a canister), cannot be attached to the bracket without the filter element first being assembled thereto. This removes any possibility that the bracket will be covered (with the shroud) without a filter element in place.

The shroud-securing fasteners, and the associated fastener-insertion receptacles are adapted for upward insertion, whereby, in many cases, a ladder will not be required for filter-element installation. And the fasteners can be such that no tools are required (e.g., thumbscrews) to replace the filter element.

These and other features of the filter element are fully described and particularly pointed out in the claims. The following description and annexed drawings set forth in detail a certain illustrative embodiment, this embodiment being indicative of but one of the various ways in which the principles may be employed.

DRAWINGS

FIG. 1 is a perspective view of the filter assembly 100 (i.e., the filter element 300, the bracket 600, and the shroud 700).

FIG. 2 is a perspective view of the filter subassembly 200 (i.e., the filter element 300 and the bracket 600).

FIGS. 4A-4K are various views of the housing 400 of the filter element 300.

FIGS. 6A-6K are various views of the bracket 600.

Figure 8:
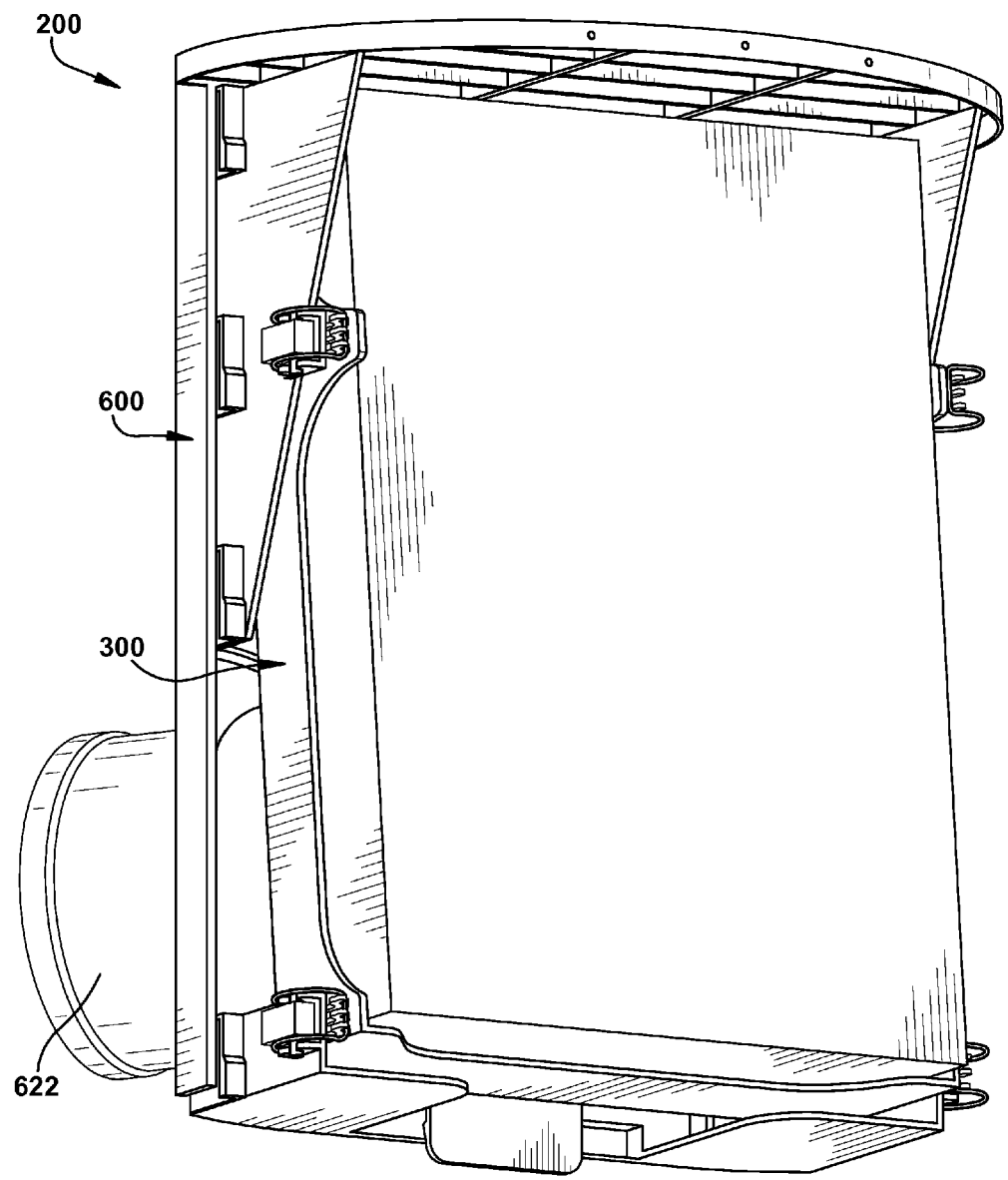

FIG. 8 is another perspective view of a filter subassembly 200 provided in accordance with the invention (i.e., the filter element 300 and the bracket 600).

Figure 9:
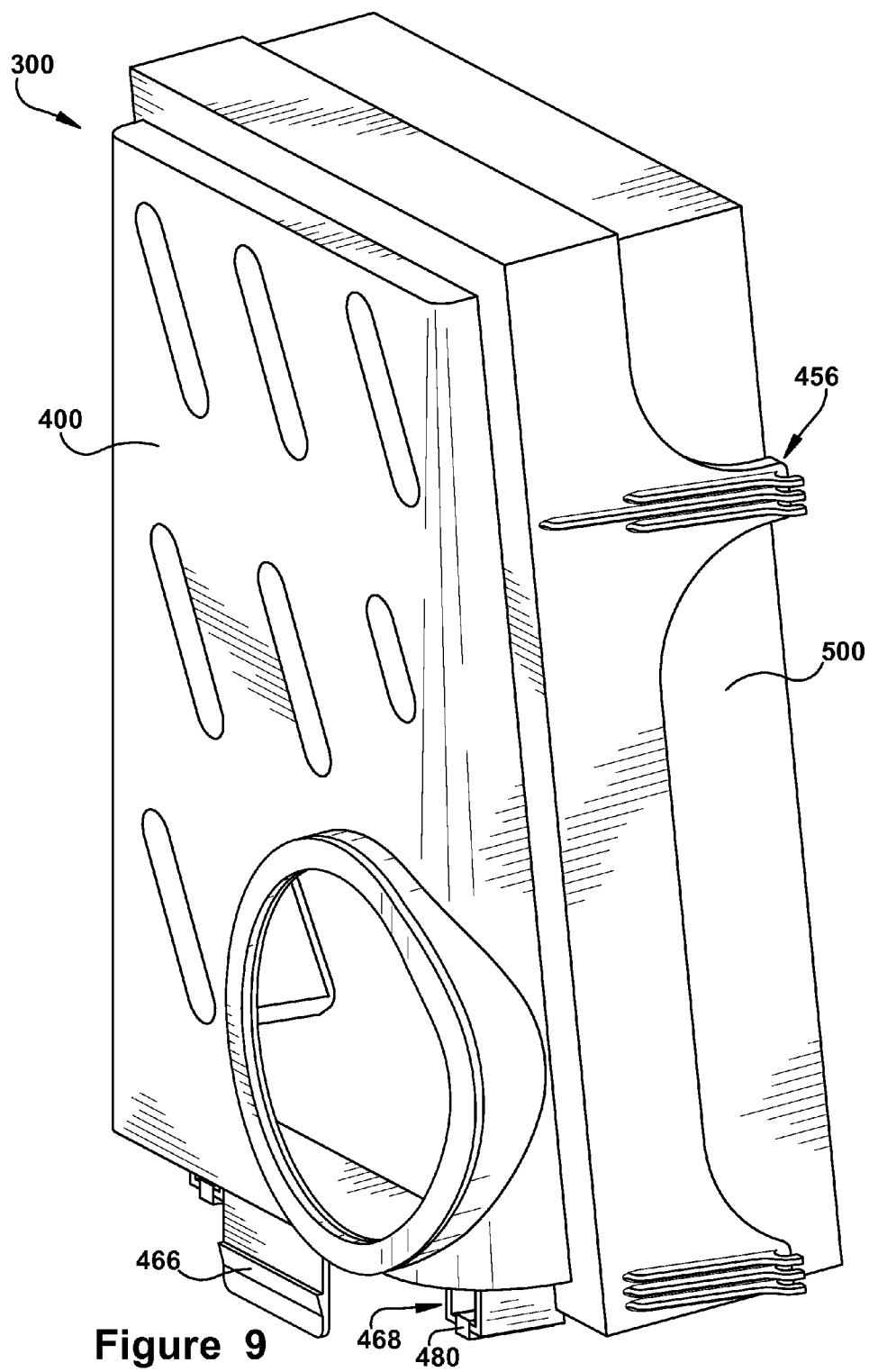

FIG. 9 is another perspective view of a filter element 300.

Figure 10:
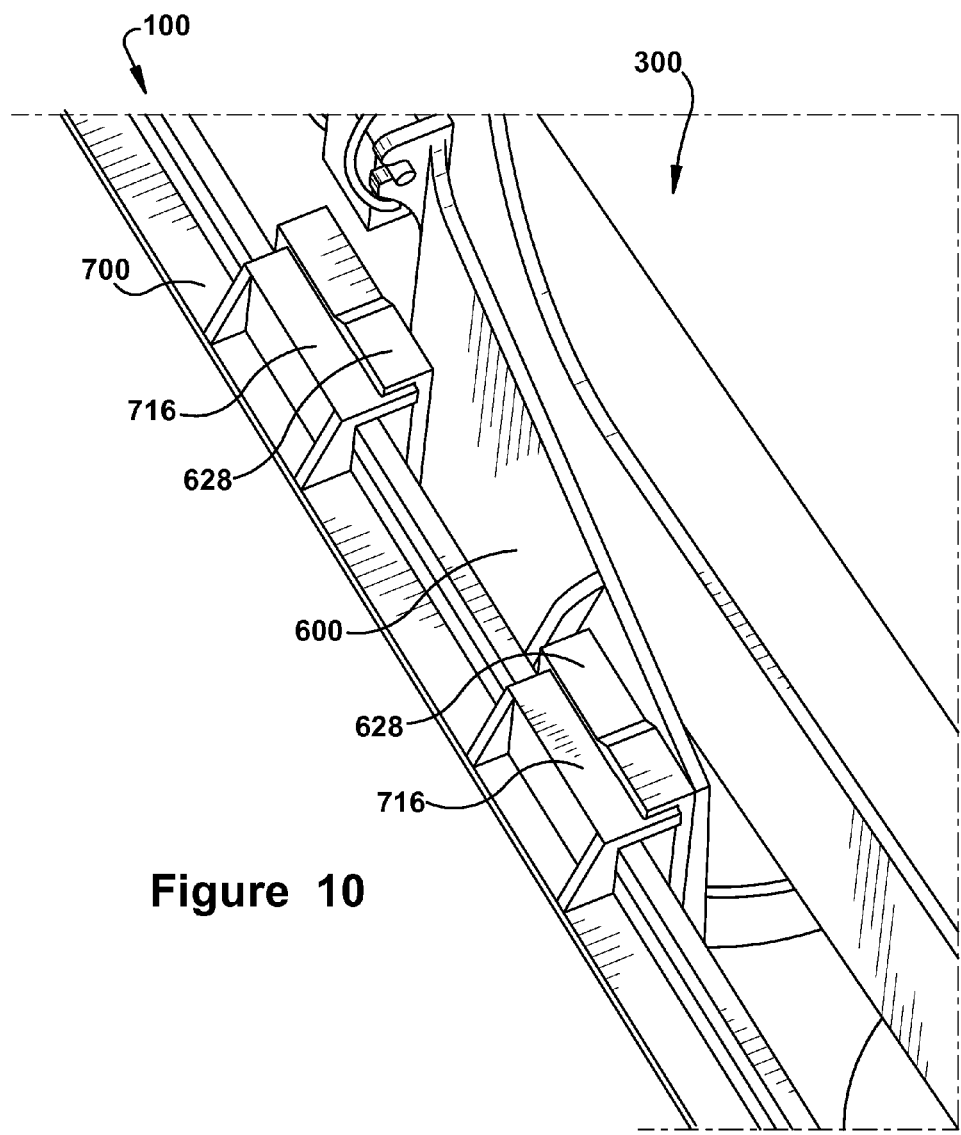

FIG. 10 is another enlarged perspective view of a portion of the filter assembly 100 (i.e., the filter element 300, the bracket 600, and the shroud 700).

Figure 11:
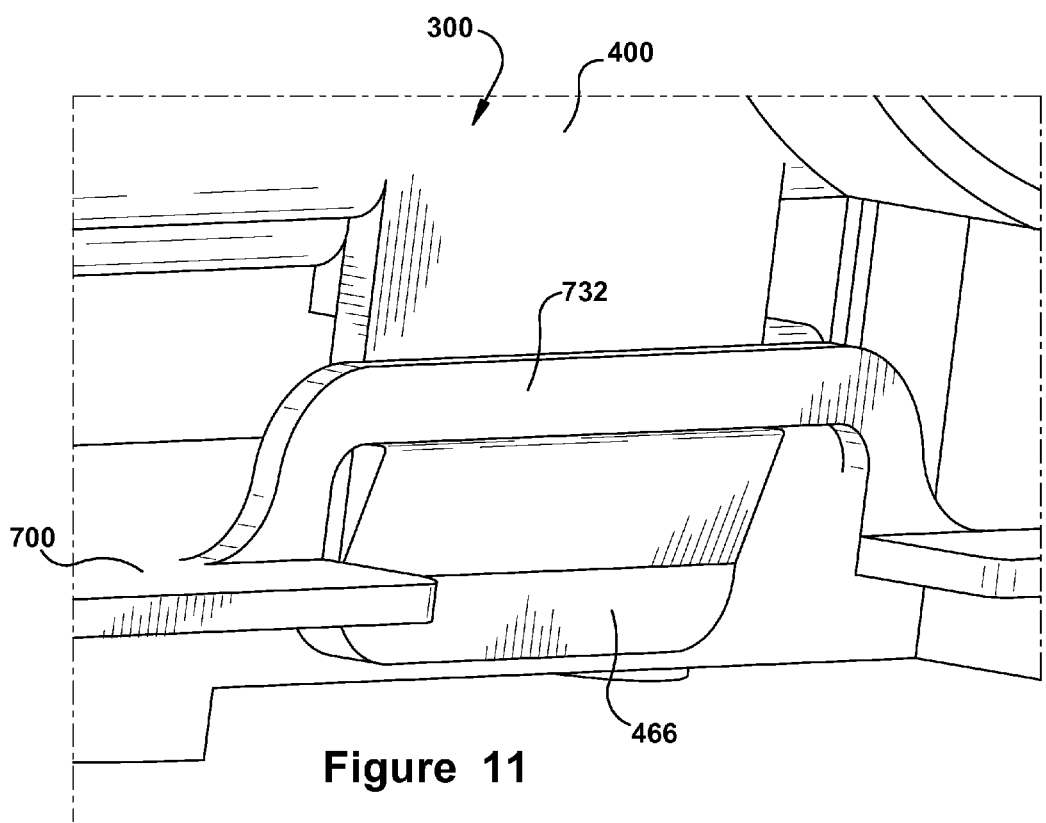

FIG. 11 is another enlarged perspective view of a portion of the filter element 200 and the shroud 700.

Figure 12:
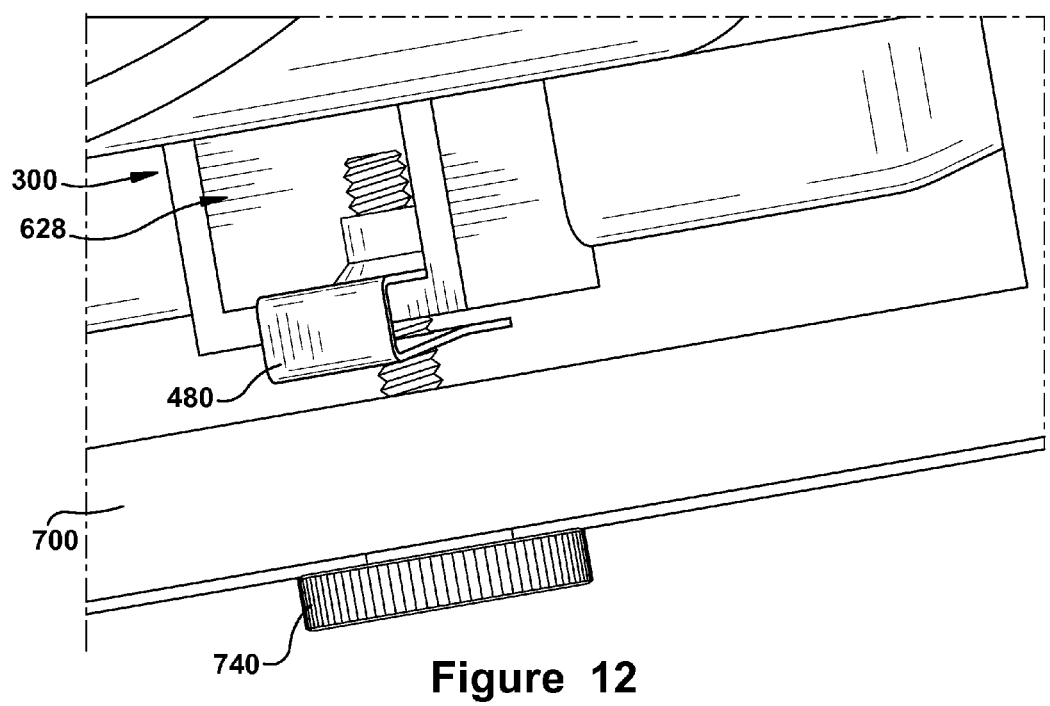

FIG. 12 is another enlarged perspective view of a portion of the filter assembly 100 (i.e., the filter element 300, the bracket 600, and the shroud 700).

Figure 13:
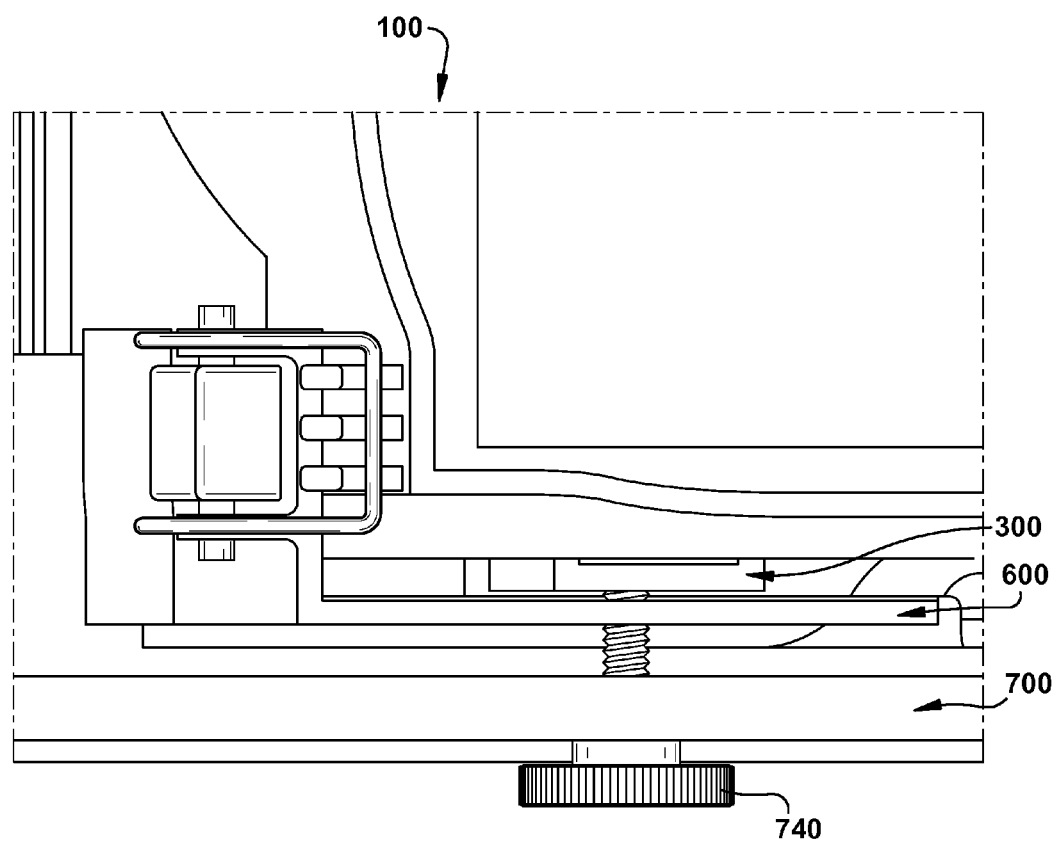

FIG. 13 is another enlarged perspective view of a portion of the filter assembly 100 (i.e., the filter element 300, the bracket 600, and the shroud 700).

DESCRIPTION

Figure 1:
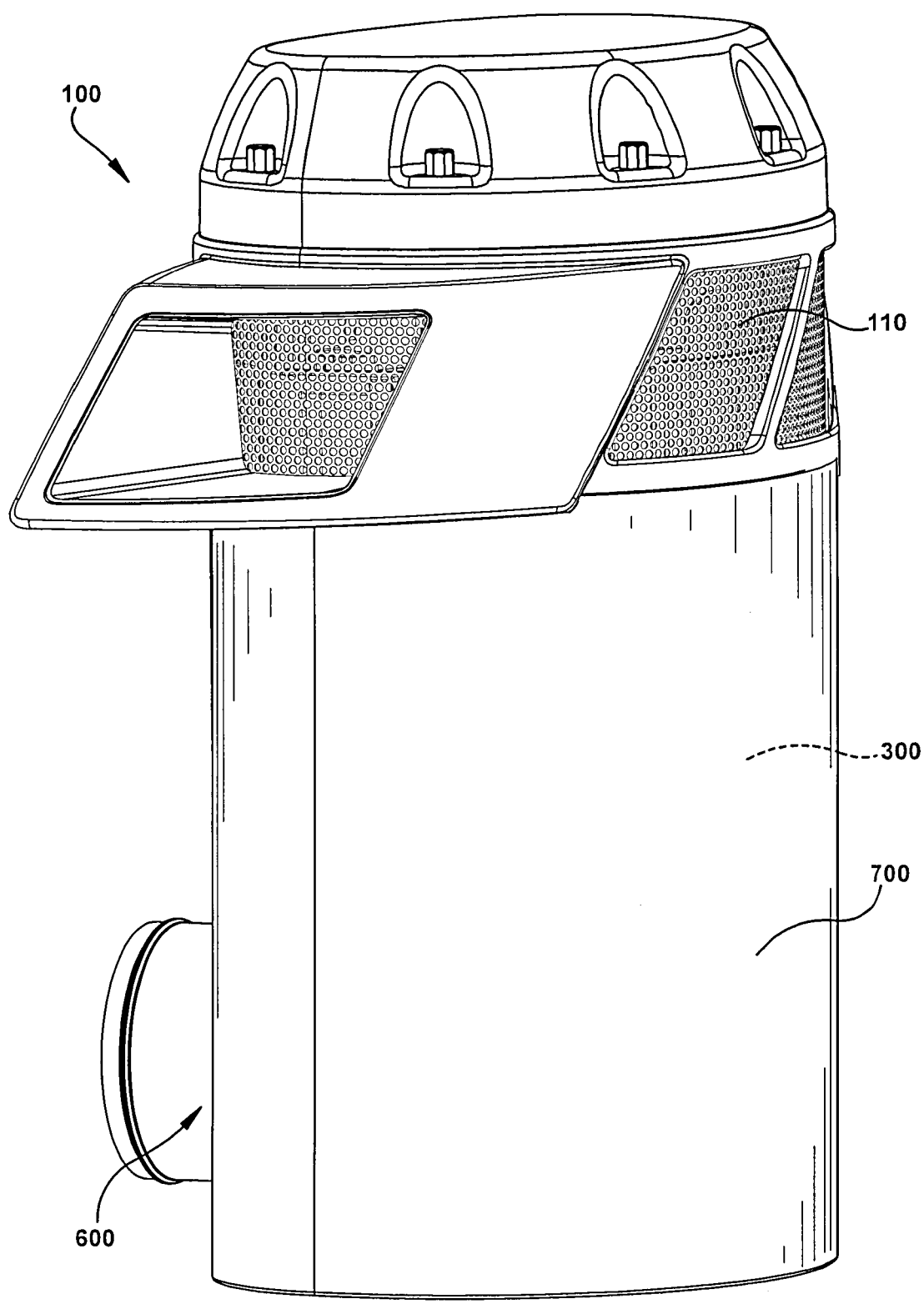
Figure 2:
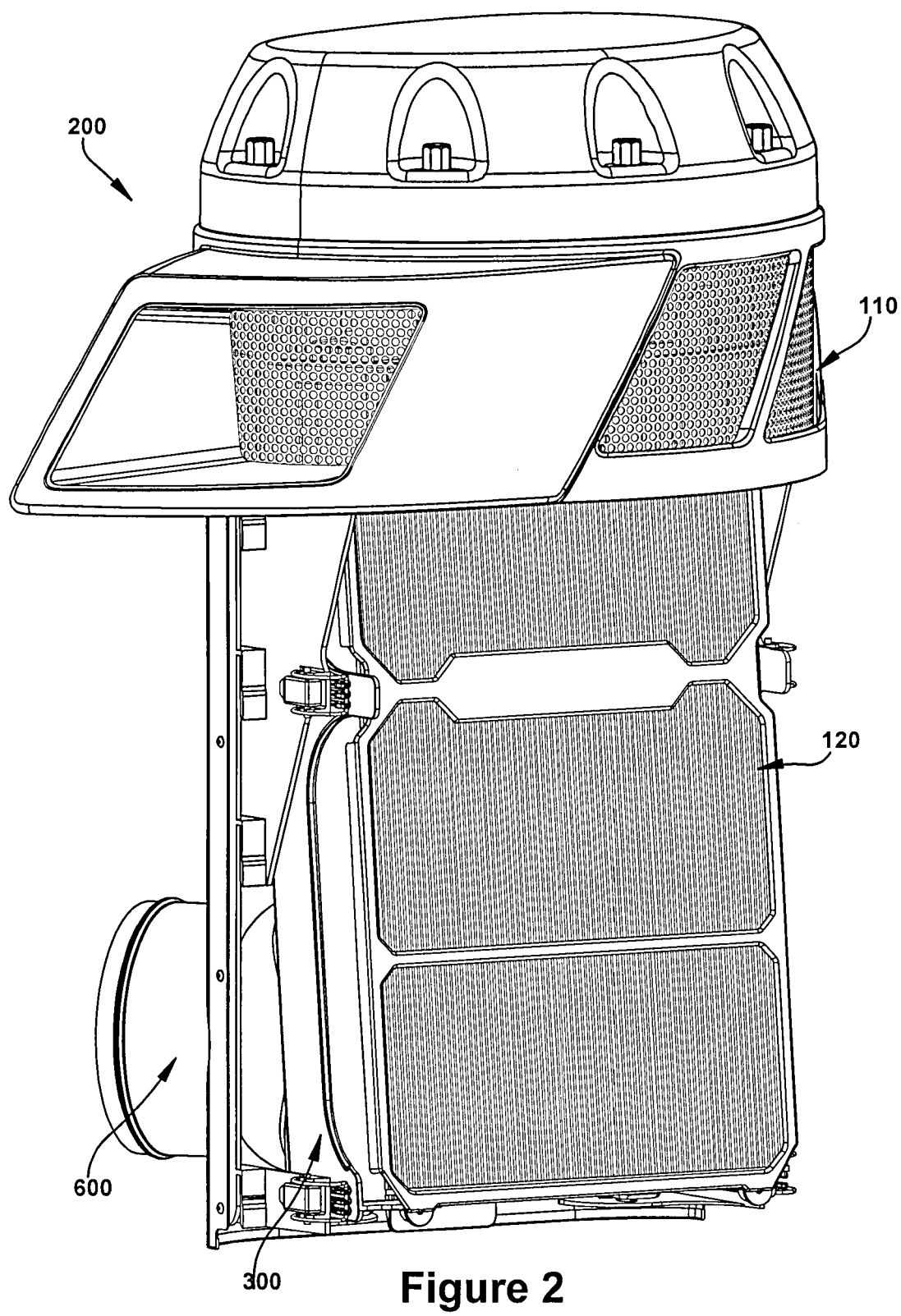

Referring now to the drawings, a filter assembly 100 is shown in FIG. 1 and a filter subassembly 200 is shown in FIG. 2. The assembly 100 comprises a filter element 300 (not visible), a bracket 600, and a shroud 700, and the subassembly 200 comprises the filter element 300 and the bracket 600 (prior to the shroud being secured thereto). The filter assembly 100 and the subassembly 200 are shown with a pre-inlet filter cap 110, and the filter subassembly 200 is also shown with a pre-inlet filter screen 120. The filter assembly 100 can be used with or without the cap 110 and/or the screen 120.

The bracket 600 and the shroud 700 would be considered permanent components, and the filter element 300 would be periodically replaced. In use, the bracket 600 is be permanently affixed to an appropriate (probably vertical) surface in the applicable setting. For example, when used as an engine-intake-air filter in a large vehicle such as truck, the bracket 600 can be fixed to the cowl panel. In any event, the filter element 300 is removably mounted to the bracket 600 and then the shroud 700 is removably secured to the bracket 600 (and the filter element 300).

Figure 3:
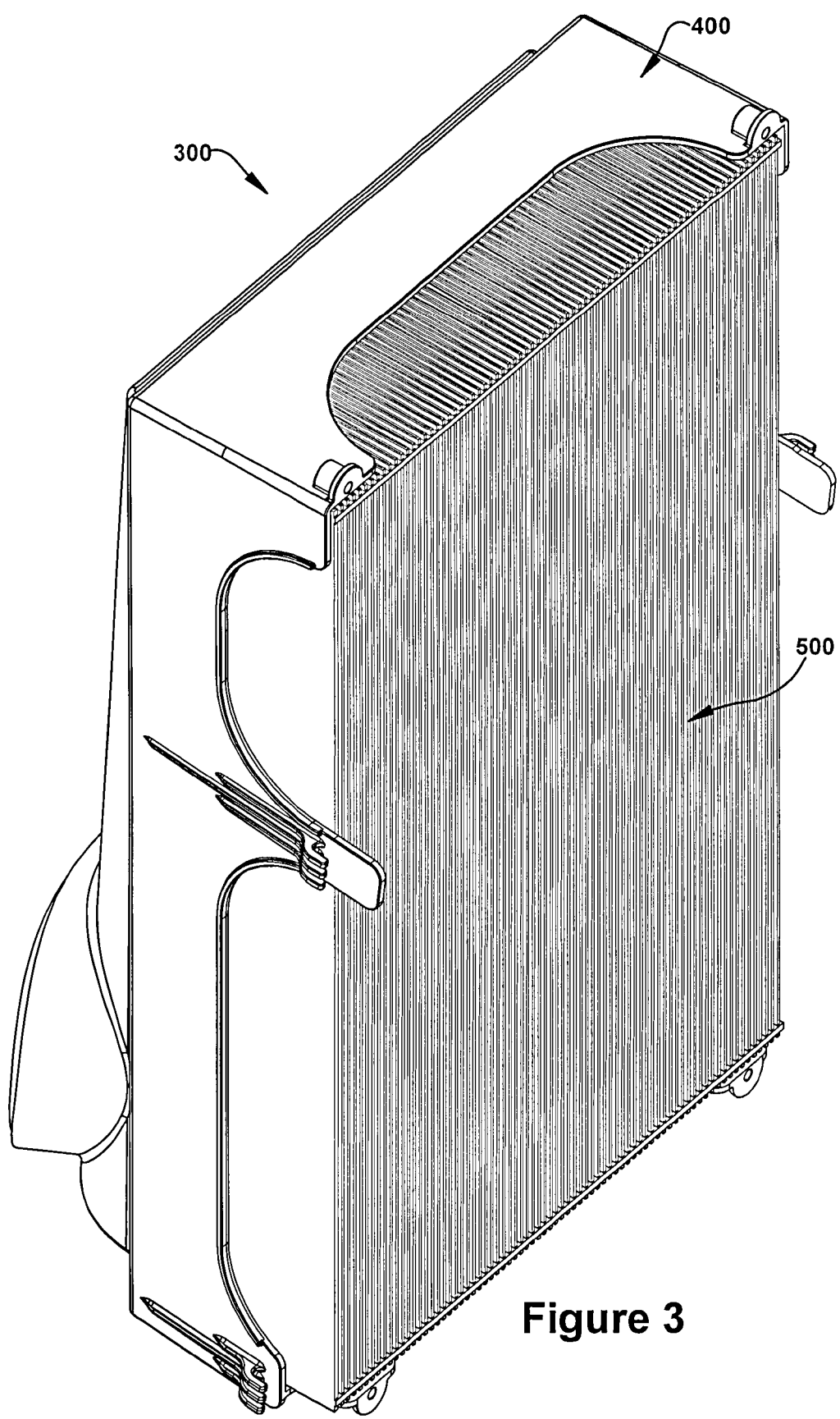
FIG. 3 is a perspective view of the filter element 300.
Figure 4D:
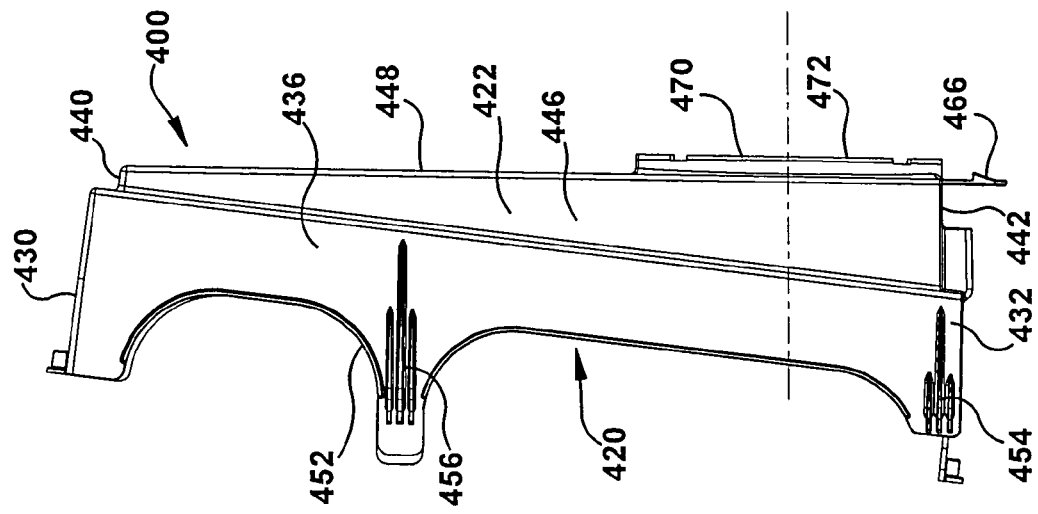
Figure 4C:
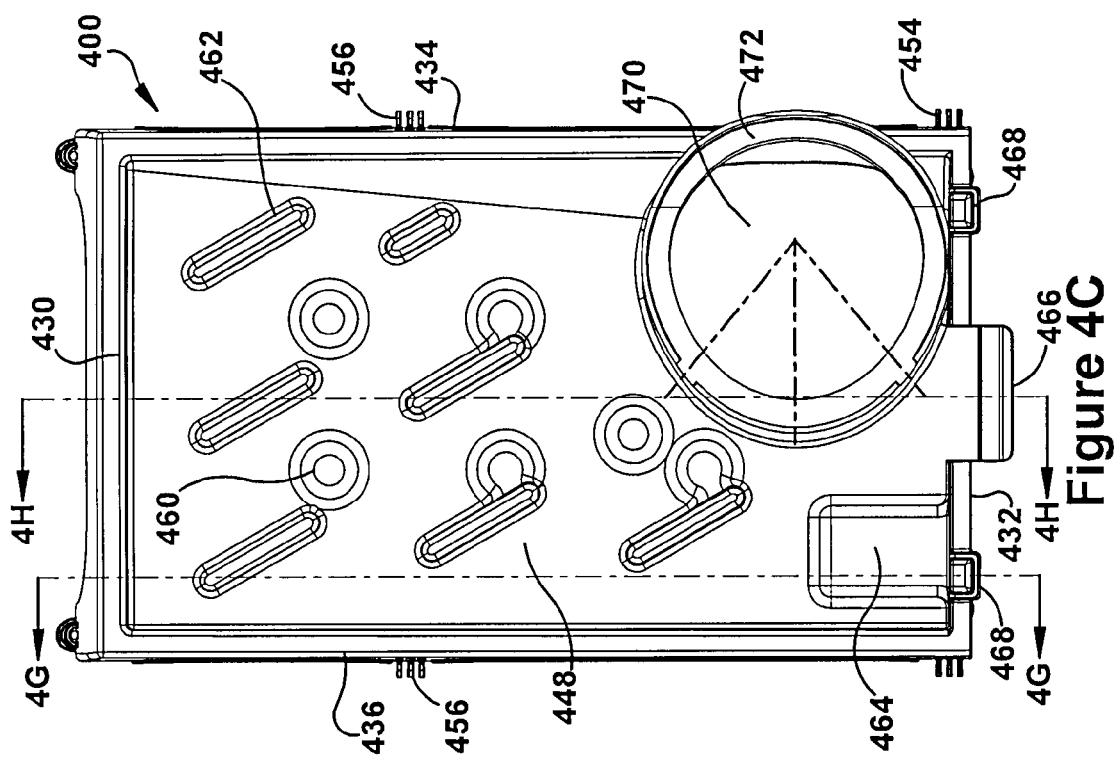

The filter element 300 is shown in FIG. 3 and comprises a housing 400 and a filter element 500. The housing 400, shown in FIGS. 4A-4H, comprises a plurality of walls forming a filter compartment 420 and an outlet chamber 422. The housing walls include a top wall 430, a bottom wall 432, side walls 434 and 436 (these walls forming the filter compartment 420), a top wall 440, a bottom wall 442, side walls 444 and 446, and a downstream wall 448 (these walls forming the outlet chamber 422). The housing walls can be formed in one piece and/or made of plastic.

The housing side walls 434 and 436 each include a projecting lower corner 450 and a projecting finger 452. The lower corners 450 carry bracket-mounting clips 454 and the fingers 452 carry bracket-mounting clips 456. These bracket-mounting clips 454/456 mount the filter element 300 to the bracket 600 in the filter assembly 100 and the filter subassembly 200.

The downstream wall 448 of the housing 400 has circular indents 460 to accommodate bracket-affixing bolt heads, ribs 462 extending into the outlet chamber 422, and a rectangular pocket 464. The bottom wall 442 has a downward catch 466 and fastener-insertion receptacles 468 which, in the filter assembly 100, are used to position/secure the shroud 700 to the bracket 600.

The downstream wall 448 further comprises a circular outlet opening 470 and an annular sealing gasket 472 that surrounds this circular opening 470. In the illustrated embodiment, the outlet opening 470 is located in a lower region and offset towards the side wall 444. The outlet opening 470 can, as shown, straddle the downstream wall 448 and the adjacent side wall 444. The outlet chamber 422 can have a triangular shape widening in the downstream direction towards the outlet opening 470. The ribs 462 can be angled to direct filtered fluid towards the outlet opening 470.

Figure 5B:
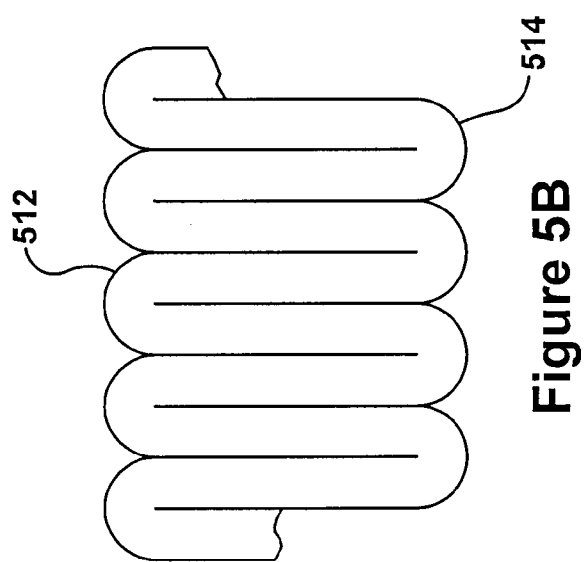
FIGS. 5A-5B are various views of the filter media 500 of the filter element 300.
Figure 5A:
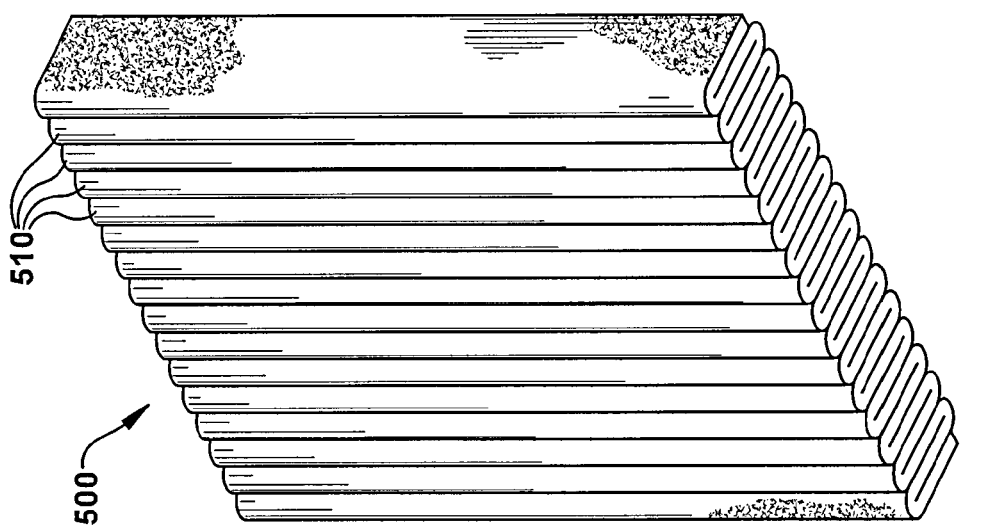
Figure 6D:
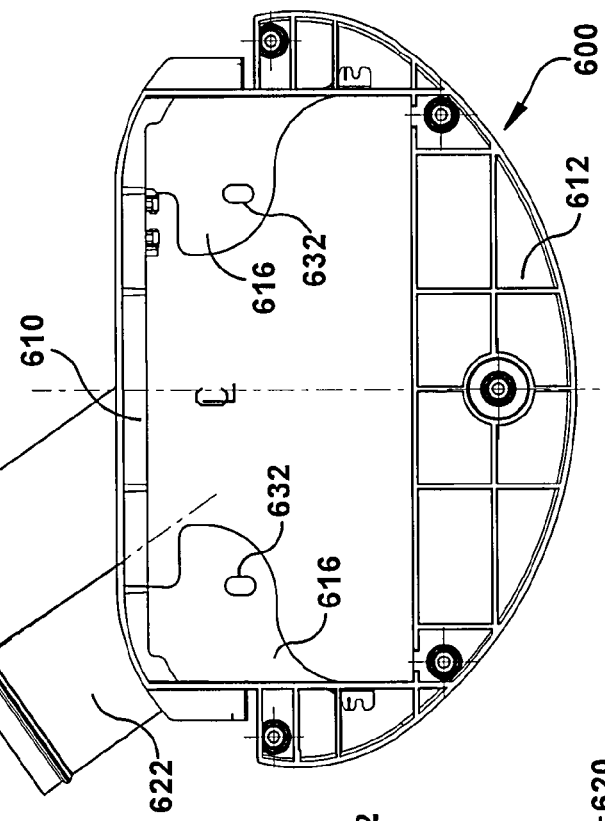
Figure 6C:
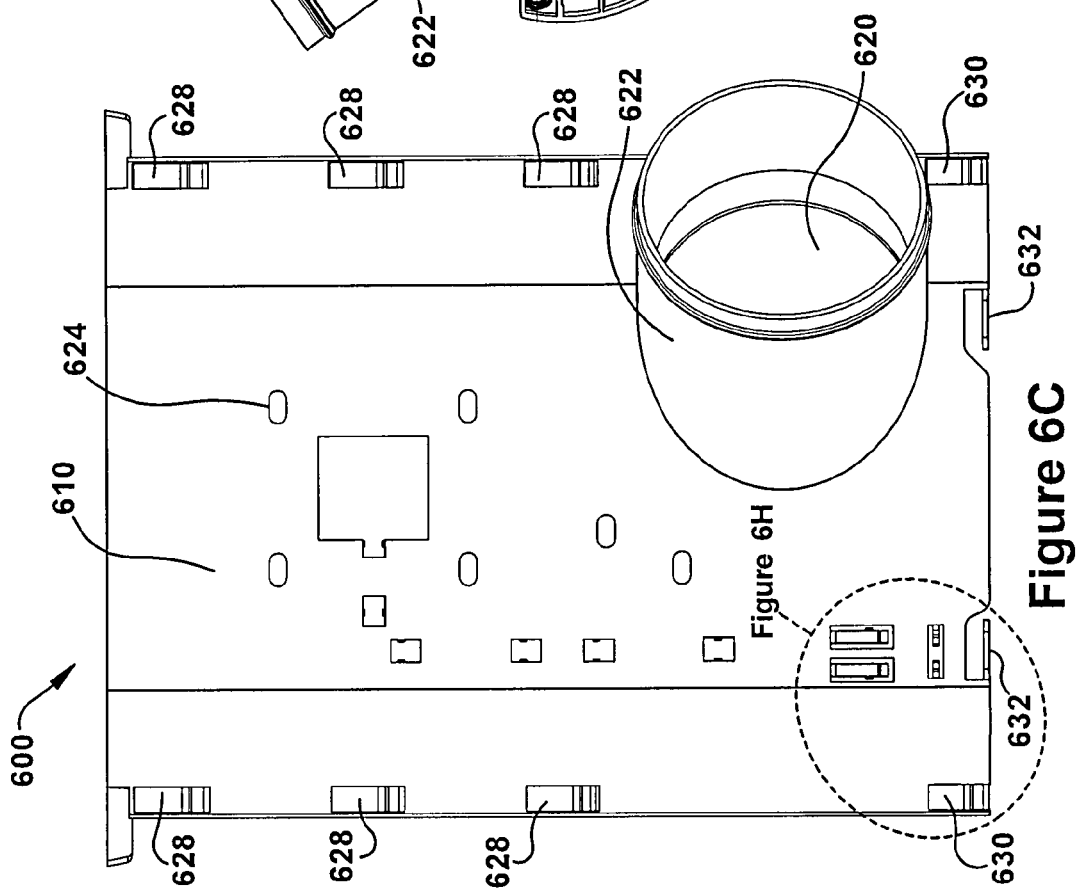

The filter element 300 further comprises a filter media 500, such as that shown in FIGS. 5A-5B. The filter media 500 comprises a sheet (or layers of sheets) with a plurality of accordion-folded pleats 510 compiled into a rectangular block. The sheets may be made from any suitable material capable of removing dust and other particulates entrained in the to-be-filtered fluid down to the smallest particle size for which the filter is rated. The upstream ends of the pleats 510 form an inlet face 512 and the downstream ends of the pleats 510 form an outlet face 514.

The filter medium 500 is positioned within the filter compartment 420 with its outlet face 514 adjacent the outlet chamber 422 and its inlet face 512 uncovered. (See FIG. 3.) The medium 500 is sealed to the housing such that fluid must flow through its outlet face 514 to enter the outlet chamber 422. The pleats 510 can be vertically aligned, and the upper face, the lower face, and the side faces of the filter media can be adhesively attached and sealed to inner surfaces of the housing walls (430, 432, 434, 436) framing the filter compartment 420.

The bracket 600 is shown in FIGS. 6A-6K and comprises vertical tray 610 and a balcony 612 extending from the top edge thereof. Upper triangular bolsters 614 adjoin the tray 610 and balcony 612, and lower feet 616 extend from the bottom edge of the tray 610. The tray 610, balcony 612, bolsters 614, and/or feet 616 can be made of plastic and/or made in one piece.

The tray 610 includes an exit opening 620 and an exit duct 622 can extend from this opening 620 in a downstream direction from the tray 610. In a vehicle air-filtering situation, for example, the exit duct 622 would be connected to an engine intake line. The exit opening 620 aligns with the outlet opening 470 in the downstream wall 448 of the filter housing 400.

The tray 610 is permanently fixed to an appropriate mounting surface (e.g., the cowl of a truck) by bolts (not shown) which extend through openings 624. These bolt openings 624 align with the circular indents 460 in the downstream wall 448 of the filter housing 400, so that the bolt heads may be received therein. In this manner, the downstream wall 448 of the filter housing 400 can lay flush against the tray 610. And the gasket 472 seats against the tray 610 and seals the interface between the outlet opening 470 in the filter housing and the exit opening 620 in the bracket.

The bracket 600 includes filter-mounting clips 626 which mate with the bracket-mounting clips 454/456 of the filter housing 400. In the illustrated embodiment, these clips 626 are located on the bolsters 614 and the feet 616. The bracket 600 further comprises shroud-hanging hooks 628 and 630, and fastener-receipts 632 for insertion of fasteners.

Figure 7A:
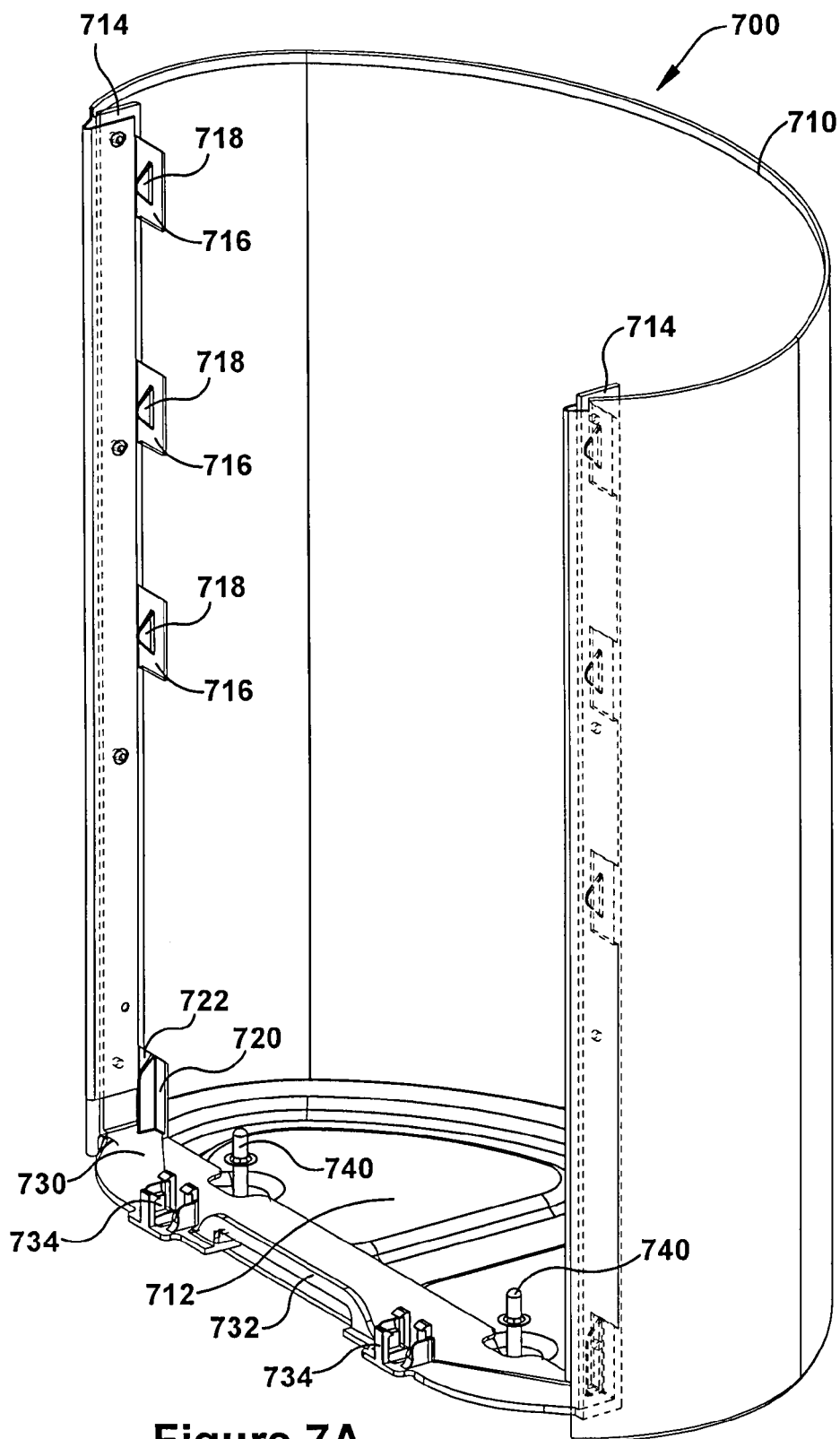
FIGS. 7A-7C are various views of the shroud 700.
Figure 7B:
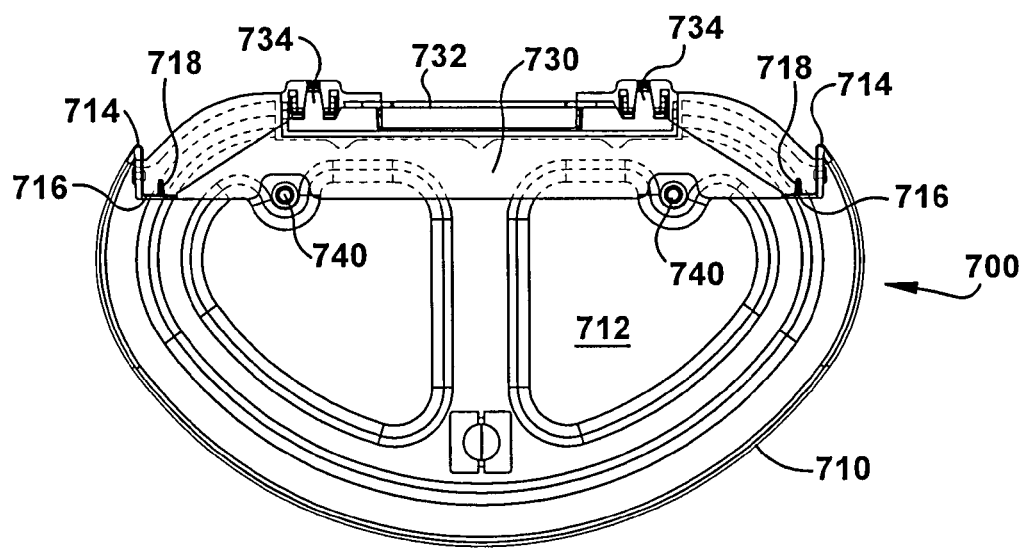
Figure 7C:
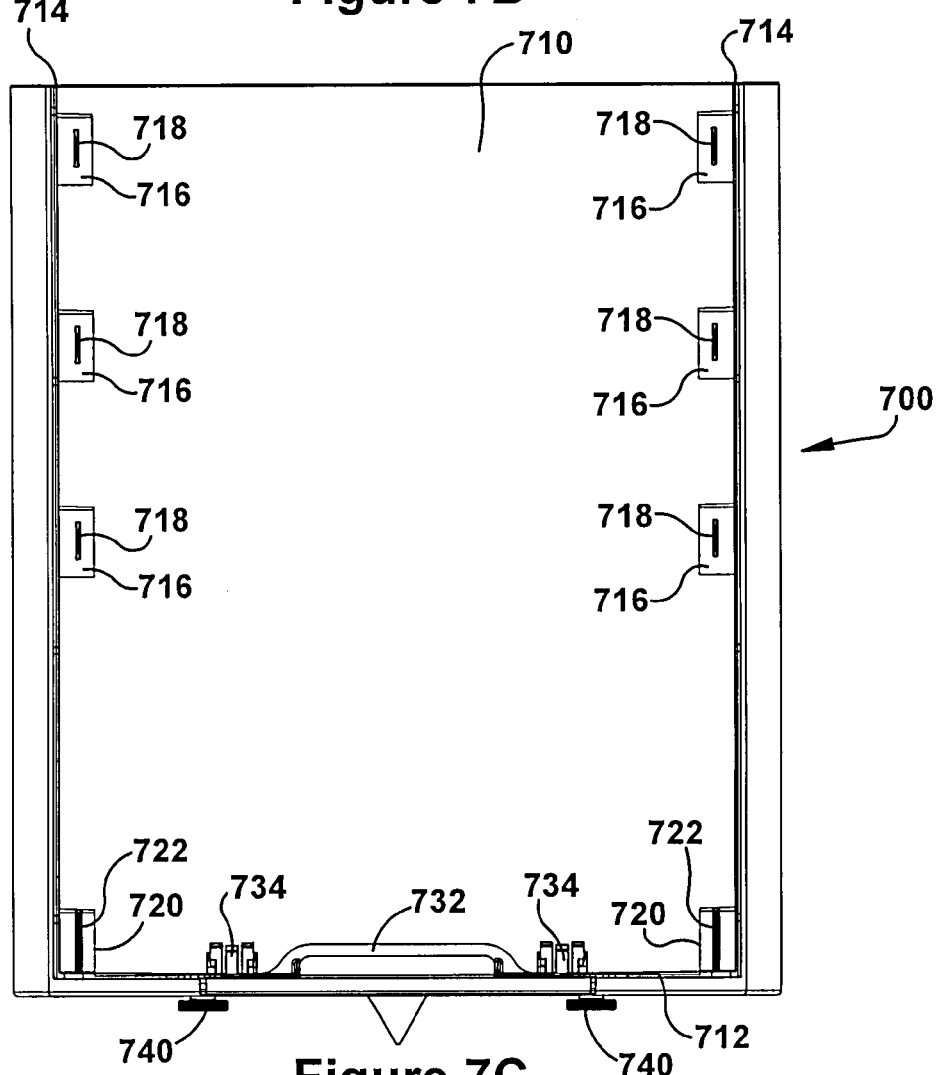

The shroud 700 is shown in FIGS. 7A-7C, and comprises a curved front curtain 710 and a bottom pan 712. The curtain 710 has side edges hemmed over reinforcement strips 714 and riveted thereto. The three upper tags 716 jut from each hem and serve as platforms for triangular tabs 718. Similarly, jutting bottom tags 720 serve as platforms for ramped tabs 722. These tags 716/722 are aligned with the shroud-hanging hooks 628 and 630 in the bracket 600.

The bottom pan 712 has a ledge 730 projecting horizontally beyond the curtain 710. The ledge's edge has a central loop 732 and clasps 734 on either side thereof. Inward a bit from this edge, the bottom pan 712 accommodates two thumbscrews 740 positioned for upward insertion. In the filter assembly 100, the loop 732 catches the catch 466 in the filter housing 400 and aligns the shroud 700 in the correct position. The shroud's clasps 734 engage the bracket 600 and the thumbscrews 740 extend through the openings 468 and 632 in the other two components. In this manner, the shroud 700 can be secured to the subassembly 200, but not the bracket 600 without the filter element 300.

A similar design that incorporates the features of the invention is shown in FIGS. 8-13. The same reference numbers are used to indicate similar parts also shown in FIGS. 1-7. In this design, the shroud 700 (FIG. 7A) attaches to both the bracket 600 and the filter element 300. This requires that the filter element 300 must be in place for the shroud 700 to be mounted, removing any possibility of assembling the shroud 700 without a filter element 300 in place. Also, the shroud 700 and the filter element 300 can be removed from the ground without using any tools. This allows for quick and easy maintenance of the filter assembly 100 (FIG. 1) from the ground without using a ladder.

The air filter 500 consists of pleated paper with the ends of the pleats sealed to its housing 400 using adhesive. The housing 400 has four over-center clip receivers (intermediate clips 456) that are used to attach the filter housing 400 to the bracket 600. The housing 400 also has a catch (latch 466) and a pair of u-nuts 480 for attachment of the shroud 700 to the filter housing 400 and the bracket 600.

The filter assembly 100 is attached to a truck using the bracket 600. The bracket 600 has a connecting tube (exit duct 600) molded into it that will connect to the air inlet duct of the truck engine. The bracket 600 also has an air inlet at the top of the bracket 600. The bracket 600 has four over-center clips 626 attached to it that hook into the filter housing 400 via clips 456 that securely latch the filter housing 400 into place.

The shroud 700 attaches to the bracket 600 and to the filter element 300. To install the shroud 700, the mounting tabs 716 on the shroud 700 are slid into the receivers (shroud hooks 628) on the bracket 600. When the shroud 700 is slid into position, the catch (latch 466) on the filter housing 400 will snap into place behind the loop 732 on the shroud 700. Then the two thumb screws 740 are inserted through the bracket 600 and thread into the u-nuts 480 on the filter housing 400.

Although the filter assembly 100, the filter subassembly 200, the filter element 300, and associated components and/or steps have been shown and described with respect to a certain embodiment, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A replaceable engine intake air filter for assembly between a mounting bracket and a shroud, the air filter comprising:
   a housing configured for detachable connection to the bracket and the shroud, the housing having walls that cooperate to define a closed shape, and the housing defines a flow path that extends through a volume bounded by the walls of the housing from an air inlet on one side of the housing to an air outlet on another side of the housing; and
   a filter medium that is adhered to the walls of the housing so that the housing and the filter medium are integrally joined together as a unit, the filter medium filling the extent of the closed shape defined by the walls of the housing, such that air flowing from the air inlet must pass through the filter medium to reach the air outlet;
   where the housing includes a mounting element that cooperates with a corresponding element of the bracket to secure the housing to the bracket independently of the shroud, and the housing includes a receptacle in a wall of the housing for receiving a fastening element for securing the shroud to the housing.

2. A filter as set forth in claim 1, wherein the elements extending from the filter housing include a plurality of bracket-mounting clips extending from the side walls.

3. A filter as set forth in claim 2, where the housing has a catch extending from the bottom wall of the housing for engagement with a corresponding feature of the shroud to align the shroud with the housing.

4. A filter as set forth in claim 3, wherein the bracket-mounting clips, the catch, and the fastener-insertion receptacle are formed in one piece with the housing walls.

5. A filter as set forth in claim 2, wherein the filter housing includes one or more fingers projecting from the side walls that carry the bracket-mounting clips, and the fingers carrying the bracket-mounting clips are situated off-center relative to the filter compartment.

6. A filter as set forth in claim 5, wherein lower corners of the housing walls also carry bracket-mounting clips.

7. A filter as set forth in claim 1, wherein:
   the housing has a plurality of walls forming a filter compartment and an outlet chamber communicating with the filter compartment,
   the filter medium has a plurality of accordion-folded pleats compiled into a rectangular block, the pleats' upstream ends forming an inlet face and the pleats' downstream ends forming an outlet face;
   the filter medium is positioned within the filter compartment with its outlet face adjacent the outlet chamber;
   the housing walls include a downstream wall having a circular outlet opening communicating with the outlet chamber, and an annular sealing gasket surrounding the outlet opening.

8. A filter as set forth in claim 7, wherein the downstream wall includes ribs extending into the outlet chamber.

9. A filter as set forth in claim 8, wherein the ribs are angled to direct filtered fluid towards the outlet opening.

10. A filter as set forth in claim 7, wherein the outlet opening is located on a lower region of the downstream wall.

11. A filter as set forth in claim 10, wherein the outlet opening is offset towards one side of the downstream wall.

12. A filter as set forth in claim 10, wherein the outlet opening straddles the downstream wall and an adjacent side wall.

13. A filter as set forth in claim 7, wherein the outlet chamber has a triangular shape widening in the downstream direction towards the outlet opening.

14. A filter as set forth in claim 7, wherein the accordion-folded pleats of the filter medium are vertically aligned.

15. A filter as set forth in claim 7, wherein the upper face, the lower face, and the side faces of the filter media are adhesively attached and sealed to inner surfaces of the housing walls framing the filter compartment.

16. A filter as set forth in claim 3, wherein the housing walls are formed in one piece and made of plastic, and wherein the bracket-mounting clips, the catch, and the fastener-insertion receptacle are formed in one piece with the housing walls.

17. An engine intake air filter subassembly comprising the filter set forth in claim 1 and the bracket, the bracket having an exit opening, wherein the extending element includes a plurality of bracket-mounting clips that mount the filter element to the bracket, and an annular sealing gasket seats against the bracket and seals the interface between the housing's outlet opening and the bracket's exit opening.

18. An engine intake air filter assembly comprising the filter set forth in claim 1, the bracket, and the shroud, wherein:
   bracket-mounting clips mount the filter element housing to the bracket;
   a catch that positions the shroud relative to the bracket; and
   fasteners that extend into respective fastener-insertion receptacles in the filter housing to attach the shroud to the filter housing and thereby secure the shroud to the bracket via the filter element.

19. A filter as set forth in claim 1, further comprising a resilient gasket surrounding the inlet or the outlet and elements of the housing cooperate with features of the bracket or the shroud to resiliently to pull the housing thereto to form a fluid seal between the housing and the bracket or the shroud.

* * * * *